United States Patent
Sato

(10) Patent No.: US 11,148,491 B2
(45) Date of Patent: Oct. 19, 2021

(54) DRAWBAR BRACKET AND WORK VEHICLE

(71) Applicant: Kubota Corporation, Osaka (JP)

(72) Inventor: Takanori Sato, Sakai (JP)

(73) Assignee: KUBOTA CORPORATION, Osaka (JP)

(*) Notice: Subject to any disclaimer, the term of this patent is extended or adjusted under 35 U.S.C. 154(b) by 209 days.

(21) Appl. No.: 16/556,178

(22) Filed: Aug. 29, 2019

(65) Prior Publication Data

US 2020/0070604 A1 Mar. 5, 2020

(30) Foreign Application Priority Data

Sep. 3, 2018 (JP) .............................. JP2018-164804

(51) Int. Cl.
*B60D 1/48* (2006.01)
*B60D 1/145* (2006.01)

(52) U.S. Cl.
CPC ............. *B60D 1/488* (2013.01); *B60D 1/145* (2013.01)

(58) Field of Classification Search
CPC ................................ B60D 1/488; B60D 1/145
See application file for complete search history.

(56) References Cited

U.S. PATENT DOCUMENTS

| | | | |
|---|---|---|---|
| 4,127,341 A | 11/1978 | Stevens | |
| 4,213,506 A | 7/1980 | Hake | |
| 5,443,127 A * | 8/1995 | Gates | A01B 19/04 172/311 |
| 6,698,785 B2 * | 3/2004 | Peters | B60D 1/07 280/489 |
| 10,589,580 B2 * | 3/2020 | Faust | B60D 1/02 |
| 2002/0144826 A1 | 10/2002 | Gerber et al. | |

FOREIGN PATENT DOCUMENTS

| | | | |
|---|---|---|---|
| CN | 202782538 U | * | 3/2013 |
| CN | 207015327 U | * | 2/2018 |
| JP | 2001-173006 | | 6/2001 |
| KR | 102095709 B1 | * | 4/2020 |

OTHER PUBLICATIONS

Extended European Search Report for corresponding EP Application No. 19194705.0-1004, dated Feb. 4, 2020.

* cited by examiner

*Primary Examiner* — Kevin Hurley

(74) *Attorney, Agent, or Firm* — Mori & Ward, LLP

(57) ABSTRACT

A drawbar bracket includes a first fastening plate, a second fastening plate, and a coupling member. The coupling member couples the first fastening plate to the second fastening plate. The first fastening plate includes a first plate body, a first fastening part, and a first curved part. The first curved part couples the first plate body to the first fastening part and has a curved shape. The second fastening plate includes a second plate body, a second fastening part, and a second curved part. The second curved part couples the second plate body to the second fastening part and has a curved shape.

18 Claims, 19 Drawing Sheets

DRAWBAR BRACKET AND WORK VEHICLE

CROSS-REFERENCE TO RELATED APPLICATIONS

The present application claims priority under 35 U.S.C. § 119 to Japanese Patent Application No. 2018-164804, filed Sep. 3, 2018. The contents of this application are incorporated herein by reference in their entirety.

BACKGROUND OF THE INVENTION

Field of the Invention

The technique disclosed herein relates to a drawbar bracket and a work vehicle.

Discussion of the Background

Japanese Unexamined Patent Application Publication No. 2001-173006 describes a work vehicle attachment device for a tractor.

SUMMARY OF THE INVENTION

According to an aspect of the present invention, a drawbar bracket includes a first fastening plate, a second fastening plate, and a coupling member. The second fastening plate is spaced apart from the first fastening plate in a first direction. The coupling member links the first fastening plate to the second fastening plate. The first fastening plate includes a first plate body, a first fastening part, and a first curved part. The first plate body is coupled to the coupling member. The first fastening part includes a first attachment surface facing in a second direction different from the first direction. The first curved part links the first plate body to the first fastening part and has a curved shape. The second fastening plate includes a second plate body, a second fastening part, and a second curved part. The second plate body is spaced apart from the first plate body in the first direction and is coupled to the coupling member. The second fastening part includes a second attachment surface facing in the second direction. The second curved part links the second plate body to the second fastening part and has a curved shape.

DESCRIPTION OF THE EMBODIMENTS

Figure 1:
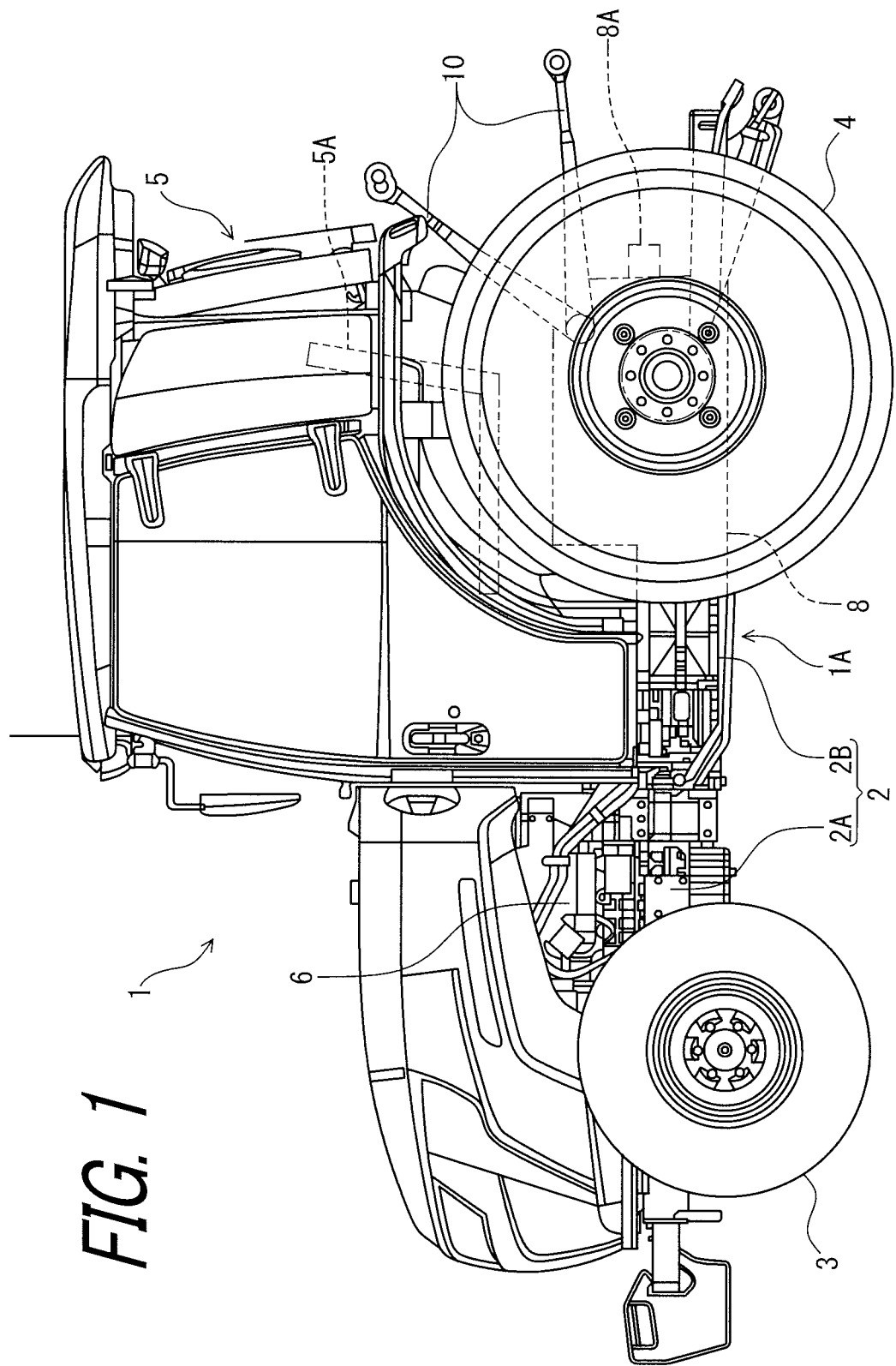
FIG. 1 is a side view of a work vehicle in accordance with an embodiment.

The embodiment(s) will now be described with reference to the accompanying drawings, wherein like reference numerals designate corresponding or identical elements throughout the various drawings.

Overall Configuration

FIG. 1 is a side view of a work vehicle 1 in accordance with the embodiment. The work vehicle 1 is, for example, an agricultural tractor. The work vehicle 1 includes a work vehicle body 1A. The work vehicle body 1A includes a vehicle body frame 2, running wheels 3 and 4, a driver's cabin 5, and an engine 6. The work vehicle 1 is preferably a four-wheel-drive vehicle and travels by rotary drive of the four running wheels 3 and 4.

In the embodiment, a front-rear direction is a front-rear direction for an operator sitting on a driver's seat 5A of the driver's cabin 5. A left-right direction and a lateral direction are a left-right direction and a lateral direction for the operator. An up-down direction is an up-down direction for the operator. It is assumed that front-rear, left-right (lateral), and height directions of the work vehicle 1 match the front-rear, left-right (lateral), and up-down directions for the operator, respectively.

The vehicle body frame 2 includes a front frame 2A and a rear frame 2B. The engine 6 is mounted on the front frame 2A. The work vehicle body 1A includes a transmission 8. The driver's cabin 5 and the transmission 8 are mounted on the rear frame 2B. The transmission 8 includes a running transmission to transmit driving force from the engine 6 to the running wheels 3 and 4. The transmission 8 further includes a work-device transmission and a clutch that distribute the driving force from the engine 6 to a work device provided separately from the running wheels 3 and 4. A power transmission system constituted by these elements such as the transmission for a work device and the clutch is referred to as a work power transmission system.

The work vehicle 1 further includes a pair of lift arms 10. The lift aims 10 are provided on a left side and a right side of the work vehicle body 1A, respectively. The lift arms 10 are swingable in the up-down direction in response to operation of a hydraulic lift cylinder that constitutes a part of the work power transmission system. The transmission 8 includes a Power Take-Off (PTO) shaft 8A. The PTO shaft

8A is a power output shaft of the work power transmission system. A link structure (not illustrated) is coupled to the pair of lift anus 10. A power transmission shaft and the like to transmit power to a work device (not illustrated) such as a rotary tilling device coupled to the link structure are connected to the PTO shaft 8A.

Figure 2:
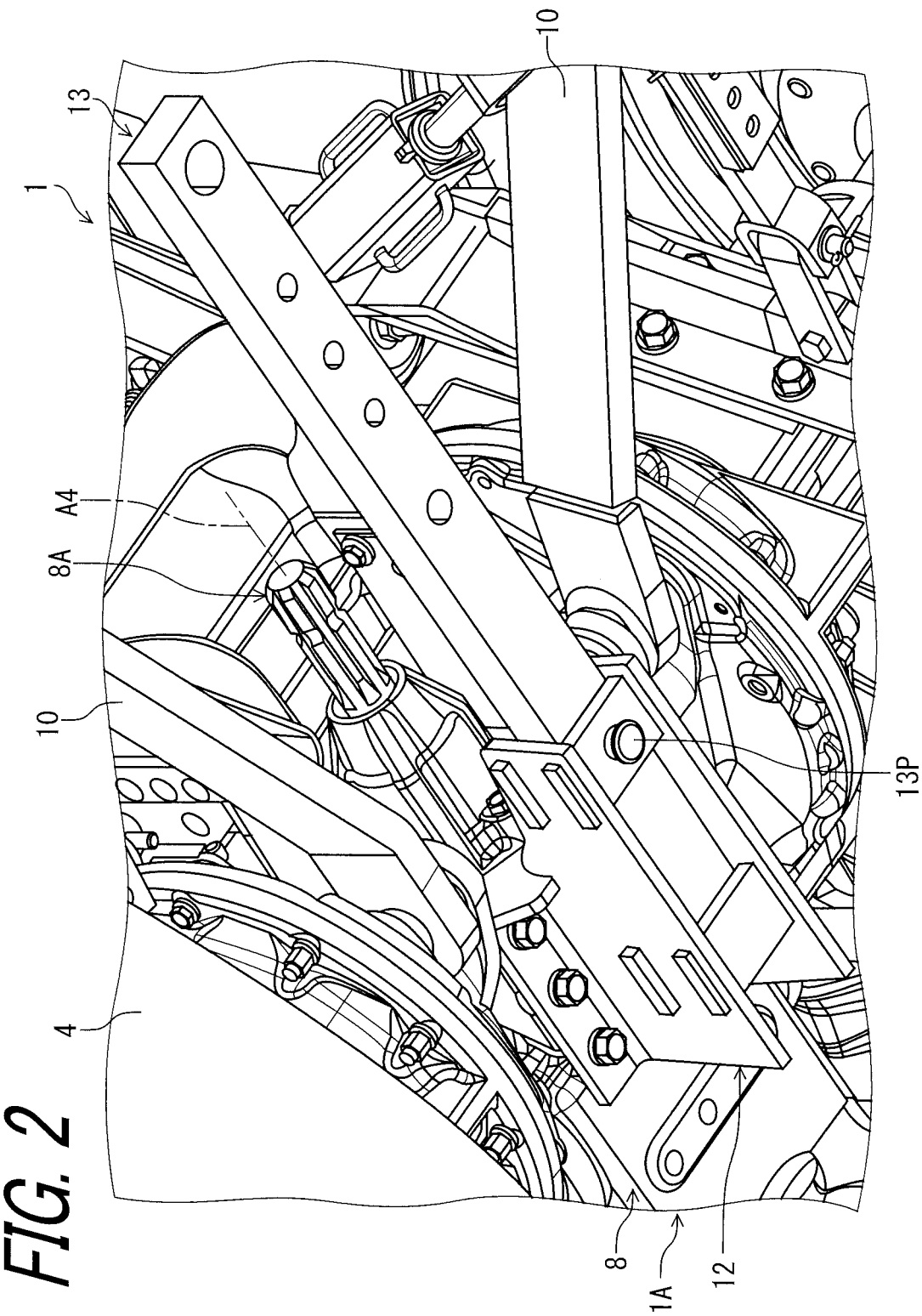
FIG. 2 is a partial perspective view of the work vehicle illustrated in FIG. 1.

As illustrated in FIG. 2, the work vehicle 1 includes a drawbar bracket 12. The drawbar bracket 12 is fastened to the work vehicle body 1A. The work vehicle 1 further includes a drawbar 13 and a coupling pin 13P. The drawbar 13 is detachably coupled to the drawbar bracket 12 with use of the coupling pin 13P. By coupling an external device such as a work machine or a trailer to the drawbar 13, the external device can be towed by the work vehicle 1. Although the drawbar bracket 12 is fastened to the transmission 8 in the present embodiment, the drawbar bracket 12 can be fastened to another member of the work vehicle body 1A.

Figure 3:
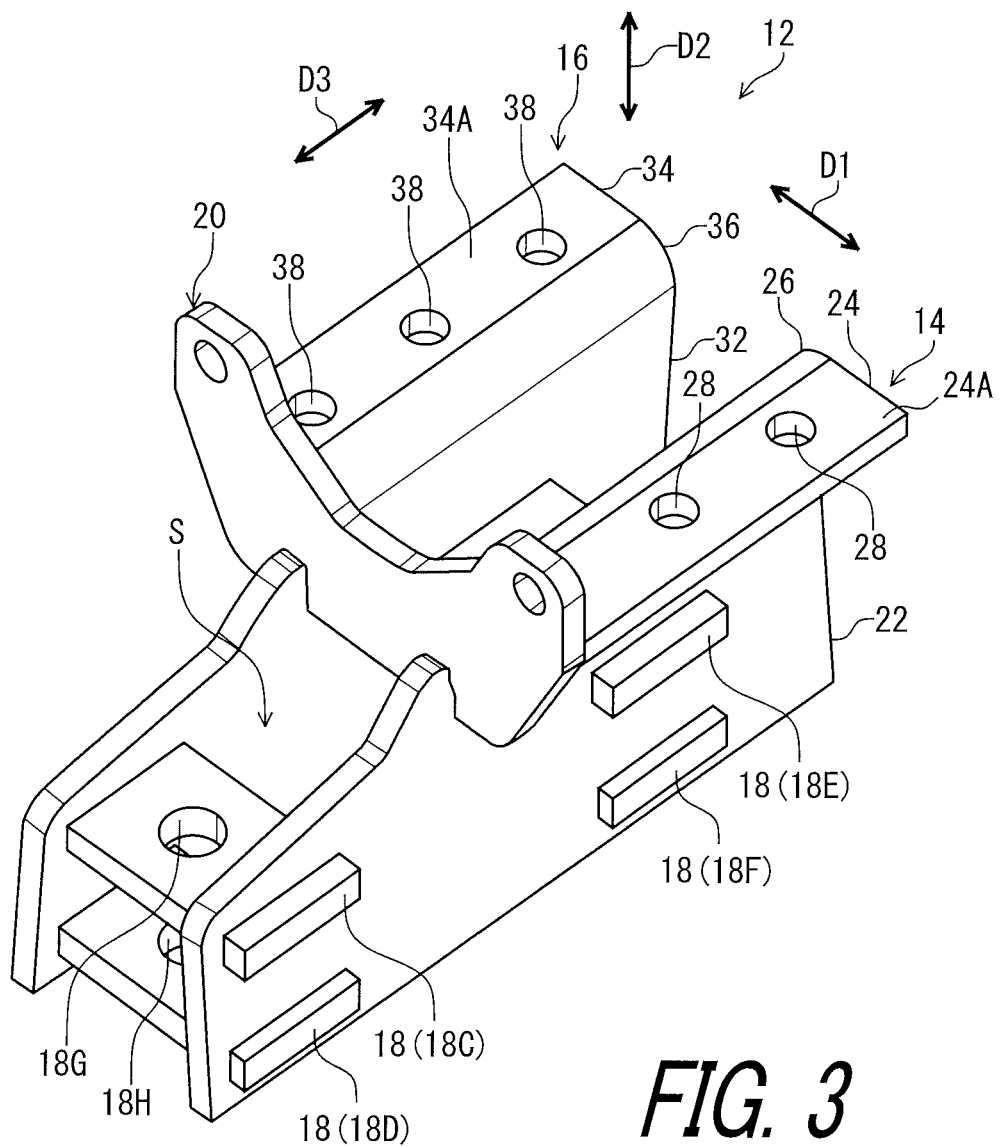
FIG. 3 is a perspective view of a drawbar bracket of the work vehicle illustrated in FIG. 1.

As illustrated in FIG. 3, the drawbar bracket 12 includes a first fastening plate 14, a second fastening plate 16, and a coupling member 18. The second fastening plate 16 is spaced apart from the first fastening plate 14 in a first direction D1. The coupling member 18 couples the first fastening plate 14 to the second fastening plate 16. An insertion space S in which the drawbar 13 is to be inserted (FIG. 2) is defined between the first fastening plate 14 and the second fastening plate 16. The drawbar bracket 12 further includes a third fastening plate 20 to couple the first fastening plate 14 to the second fastening plate 16. In the present embodiment, the drawbar bracket 12 includes a plurality of coupling members 18 (18C to 18F) coupling the first fastening plate 14 to the second fastening plate 16. However, a total number of the coupling members 18 is not limited to that described in the present embodiment.

Figure 4:
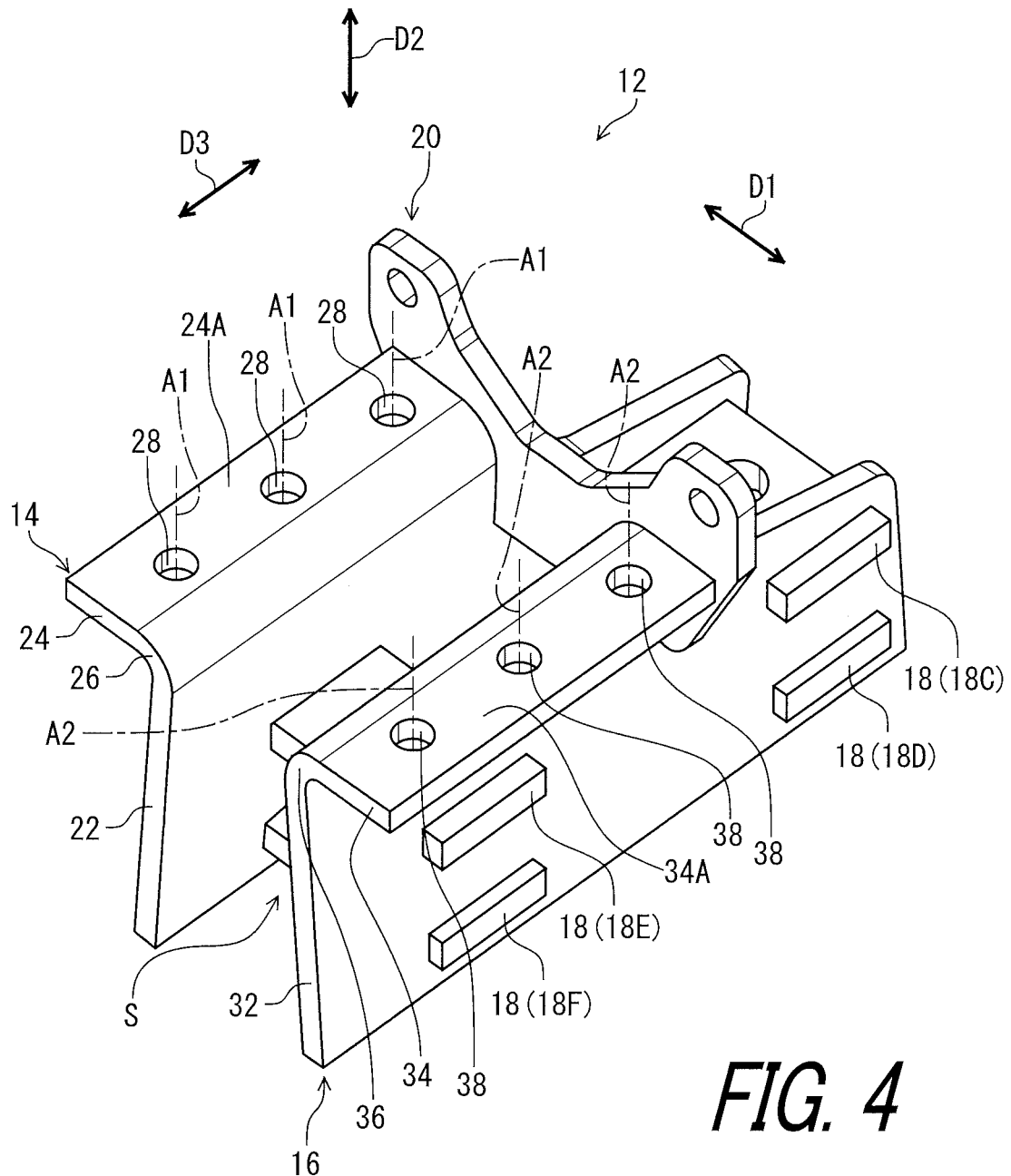
FIG. 4 is another perspective view of the drawbar bracket illustrated in FIG. 3.

As illustrated in FIG. 4, the first fastening plate 14 includes a first plate body 22, a first fastening part 24, and a first curved part 26. The first plate body 22 is coupled to the coupling member 18. The first fastening part 24 includes a first attachment surface 24A. The first attachment surface 24A faces in a second direction D2 different from the first direction D1. In the present embodiment, the second direction D2 is perpendicular to the first direction D1, but the second direction D2 can be inclined with respect to the first direction D1.

The first fastening part 24 includes a first opening 28 provided in the first attachment surface 24A. In the present embodiment, the first fastening part 24 includes a plurality of first openings 28. The plurality of first openings 28 are spaced apart from one another in a third direction D3 perpendicular to the first direction D1 and the second direction D2. The first openings 28 include a hole but can include another structure such as a slit instead of or in addition to the hole. A total number of the first openings 28 is not limited to that described in the present embodiment.

Each of the first openings 28 includes a first center axis A1. In the present embodiment, the first center axis A1 extends perpendicularly to the first attachment surface 24A. That is, the first center axis A1 is parallel with the second direction D2. However, the first center axis A1 can be inclined with respect to at least one of the first attachment surface 24A and the second direction D2.

As illustrated in FIG. 4, the second fastening plate 16 includes a second plate body 32, a second fastening part 34, and a second curved part 36. The second plate body 32 is spaced apart from the first plate body 22 in the first direction D1. The second plate body 32 is coupled to the coupling members 18. The insertion space S is defined between the first plate body 22 and the second plate body 32. The second fastening part 34 includes a second attachment surface 34A. The second attachment surface 34A faces in the second direction D2.

The second fastening part 34 includes a second opening 38 provided in the second attachment surface 34A. In the present embodiment, the second fastening part 34 includes a plurality of second openings 38. The plurality of second openings 38 are spaced apart from one another in the third direction D3. The second openings 38 include a hole but can include another structure such as a slit instead of or in addition to the hole. A total number of the second openings 38 is not limited to that described in the present embodiment.

Each of the second openings 38 includes a second center axis A2. In the present embodiment, the second center axis A2 extends perpendicularly to the second attachment surface 34A. That is, the second center axis A2 is parallel with the second direction D2. However, the second center axis A2 can be inclined with respect to at least one of the second attachment surface 34A and the second direction D2.

Figure 5:
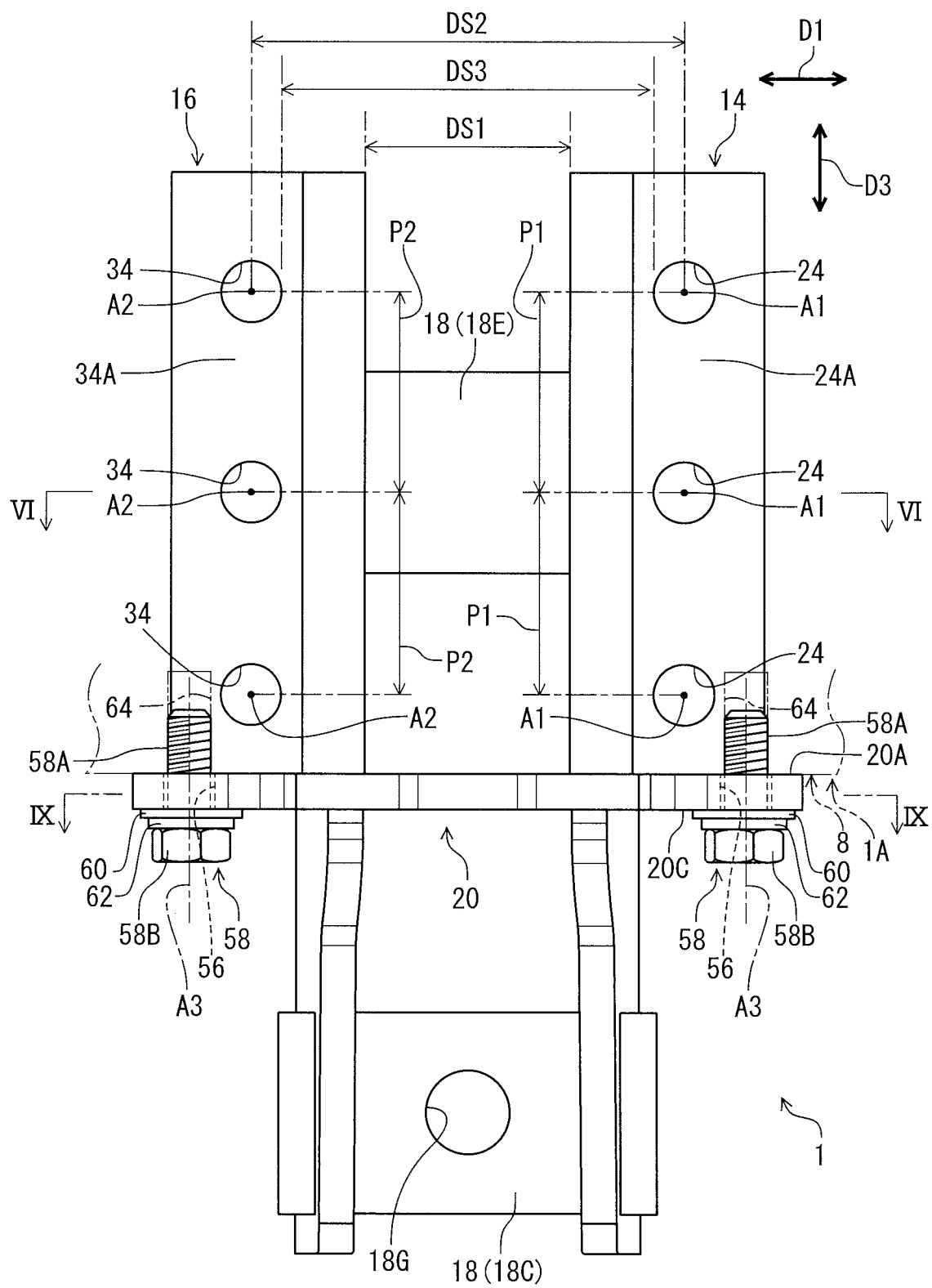
FIG. 5 is top view of the drawbar bracket illustrated in FIG. 3.

As illustrated in FIG. 5, for example, the first center axis A1 extends through a center of figure of each of the first openings 28 when viewed in the second direction D2 (a direction extending along the first center axis A1). For example, the second center axis A2 extends through a center of figure of each of the second openings 38 when viewed in the second direction D2 (a direction extending along the second center axis A2). The plurality of first openings 28 are arranged in the third direction D3 at first pitches P1. The plurality of second openings 38 are arranged in the third direction D3 at second pitches P2. Although the first pitch P1 is equal to the second pitch P2 in the present embodiment, the first pitch P1 can be different from the second pitches P2. The plurality of first openings 28 can be disposed at different pitches. The plurality of second openings 38 can be disposed at different pitches.

Figure 6:
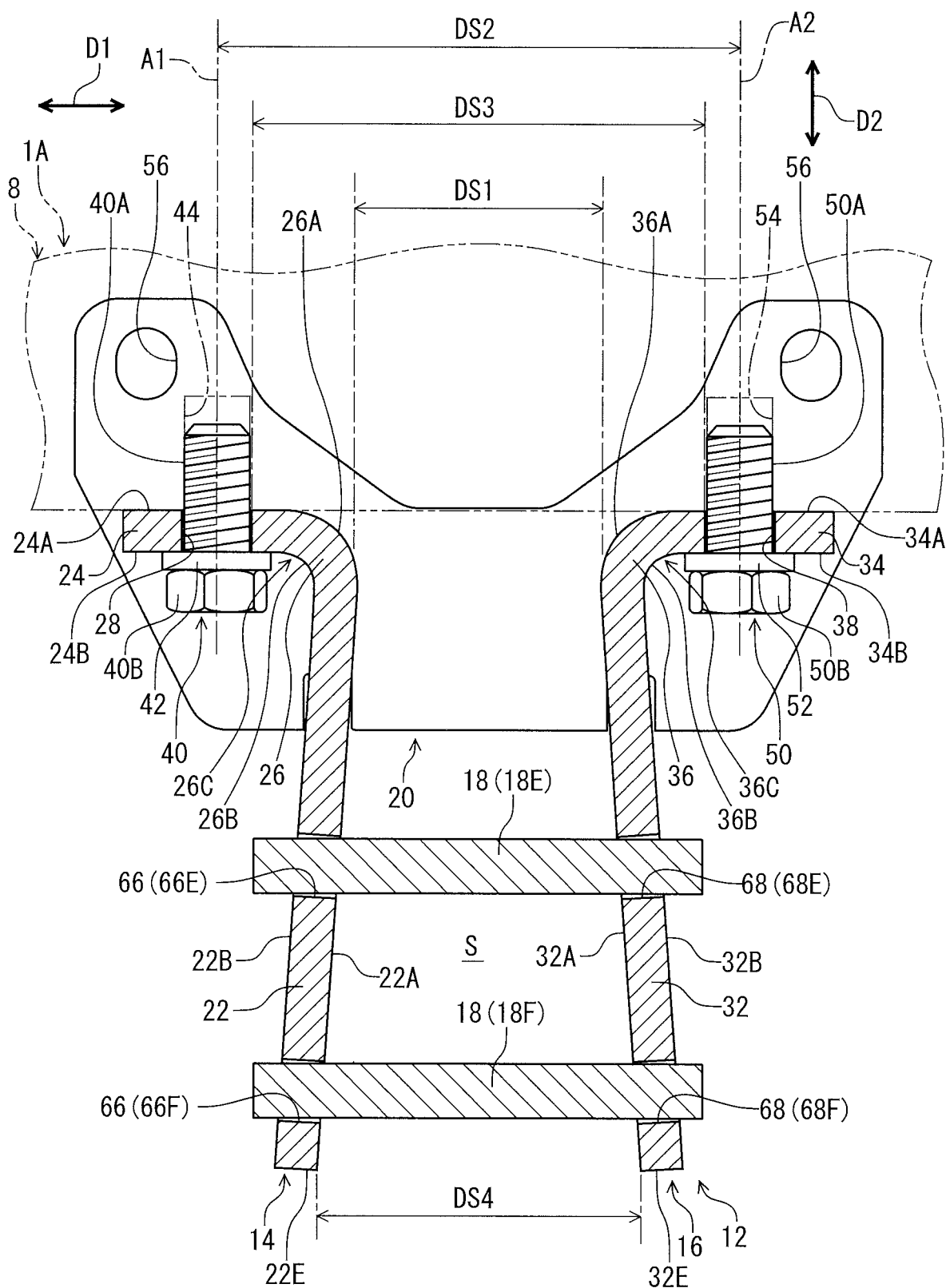
FIG. 6 is a cross-sectional view of the drawbar bracket taken along line VI-VI in FIG. 5.

As illustrated in FIG. 6, the first fastening part 24 and the second fastening part 34 of the drawbar bracket 12 are fastened to the work vehicle body 1A. In the present embodiment, the first fastening part 24 and the second fastening part 34 of the drawbar bracket 12 are fastened to the transmission 8. However, the first fastening part 24 and the second fastening part 34 can be fastened to a part other than the transmission 8 of the work vehicle body 1A. The first attachment surface 24A can be in contact with the work vehicle body 1A. The second attachment surface 34A can be in contact with the work vehicle body 1A.

The first curved part 26 couples the first plate body 22 to the first fastening part 24 and has a curved shape. In the present embodiment, the first plate body 22, the first fastening part 24, and the first curved part 26 are integrally provided as a one-piece unitary member. For example, the first plate body 22, the first fastening part 24, and the first curved part 26 are formed from a single plate material by pressing. However, the first fastening plate 14 can be formed by a process other than pressing. At least two of the first plate body 22, the first fastening part 24, and the first curved part 26 can be constituted by different members. Examples of a material of the first fastening plate 14 include a metallic material such as iron.

The second curved part 36 couples the second plate body 32 to the second fastening part 34 and has a curved shape. In the present embodiment, the second plate body 32, the second fastening part 34, and the second curved part 36 are integrally provided as a one-piece unitary member. For example, the second plate body 32, the second fastening part 34, and the second curved part 36 are formed from a single plate material by pressing. However, the second fastening plate 16 can be formed by a process other than pressing. At least two of the second plate body 32, the second fastening part 34, and the second curved part 36 can be constituted by different members. Examples of a material of the second fastening plate 16 include a metallic material such as iron.

The first fastening plate 14 is a member separate from the second fastening plate 16. The coupling members 18 are members separate from the first fastening plate 14 and the second fastening plate 16. However, the first fastening plate 14 can be provided integrally with the second fastening plate 16 as a one-piece unitary member. The coupling members 18 can be provided integrally with at least one of the first fastening plate 14 and the second fastening plate 16 as a one-piece unitary member. Examples of a material of the coupling members 18 include a metallic material such as iron.

The first fastening part 24 extends from the first curved part 26 toward an opposite side of the second fastening part 34. The second fastening part 34 extends from the second curved part 36 toward an opposite side of the first fastening part 24. The first curved part 26 is spaced apart from the second curved part 36 in the first direction D1. A first distance DS1 is defined between the first curved part 26 and the second curved part 36 in the first direction D1. A second distance DS2 is defined between the first center axis A1 and the second center axis A2 in the first direction D1. The second distance DS2 is longer than the first distance DS1. A third distance DS3 is defined between the first opening 28 and the second opening 38 in the first direction Dl. The third distance DS3 is longer than the first distance DS1. A fourth distance DS4 is defined between the first plate body 22 and the second plate body 32 in the first direction D1. A maximum length of the fourth distance DS4 is longer than the first distance DS1 and is shorter than the second distance DS2 and the third distance DS3.

In the present embodiment, the first distance DS1 is a shortest distance defined between the first curved part 26 and the second curved part 36 in the first direction D1. The second distance DS2 is a shortest distance defined between the first center axis A1 and the second center axis A2 in the first direction D1. The third distance DS3 is a shortest distance defined between the first opening 28 and the second opening 38 in the first direction D1. A dimensional relationship among the first distance DS1, the second distance DS2, the third distance DS3, and the fourth distance DS4 is not limited to that described in the present embodiment.

As illustrated in FIG. 5, the first pitch P1 is shorter than the first distance DS1, the second distance DS2, and the third distance DS3. The second pitch P2 is shorter than the first distance DS1, the second distance DS2, and the third distance DS3. However, a dimensional relationship among the first distance DS1, the second distance DS2, the third distance DS3, the first pitch P1, and the second pitch P2 is not limited to that described in the present embodiment.

As illustrated in FIG. 6, the first fastening part 24 includes a first rear surface 24B provided on a rear side of the first attachment surface 24A. The first openings 28 extend along the first center axis A1 from the first attachment surface 24A to the first rear surface 24B. In the present embodiment, the first attachment surface 24A and the first rear surface 24B are substantially perpendicular to the first center axis A1, but at least one of the first attachment surface 24A and the first rear surface 24B can be inclined with respect to the first center axis A1.

The first plate body 22 extends from the first curved part 26 away from the first attachment surface 24A. The first plate body 22 extends along the second direction D2 from the first curved part 26 away from the first attachment surface 24A. The first plate body 22 includes a first inner side surface 22A provided to face toward the second plate body 32. The first inner side surface 22A is at least partly inclined with respect to the first center axis A1. In the present embodiment, the first inner side surface 22A is entirely inclined with respect to the first center axis A1. However, the first inner side surface 22A can be partly inclined with respect to the first center axis A1 or can be at least partly parallel with the first center axis A1.

Figure 7:
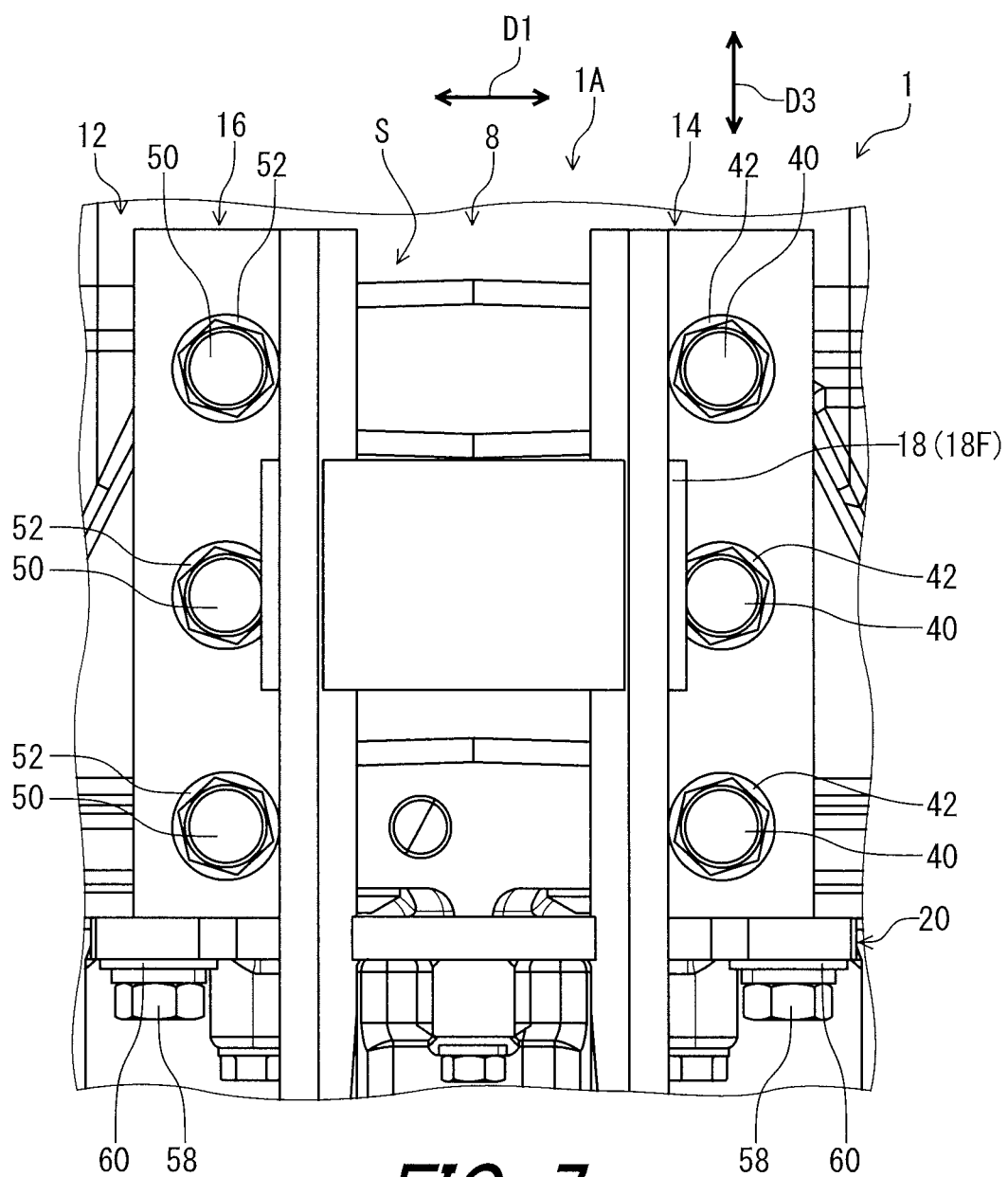
FIG. 7 is a partial bottom view of the work vehicle illustrated in FIG. 1.

As illustrated in FIG. 7, the work vehicle 1 includes a first bolt 40 and a first washer 42 which are provided to attach the drawbar bracket 12 to the work vehicle body 1A. In the present embodiment, the work vehicle 1 includes a plurality of first bolts 40 and a plurality of first washers 42. A total number of the first bolts 40 is not limited to that described in the present embodiment. A total number of the first washers 42 is not limited to that described in the present embodiment.

As illustrated in FIG. 6, the first fastening part 24 is fastened to the work vehicle body 1A (in the present embodiment, the transmission 8) with use of the first bolts 40. The first bolts 40 are inserted into the first openings 28 in a state where the drawbar bracket 12 is attached to the work vehicle body 1A. The first attachment surface 24A is in contact with the work vehicle body 1A (in the present embodiment, the transmission 8) in a state where the drawbar bracket 12 is attached to the work vehicle body 1A.

Each of the first bolts 40 includes a first male screw 40A and a first head 40B. The first male screw 40A is screwed into a first screw opening 44 of the transmission 8 through the first opening 28 in a state where the drawbar bracket 12 is attached to the work vehicle body 1A. The first fastening part 24 and the first washer 42 are sandwiched between the transmission 8 and the first head 40B in a state where the drawbar bracket 12 is attached to the work vehicle body 1A. The first washer 42 is in contact with the first rear surface 24B in a state where the drawbar bracket 12 is attached to the work vehicle body 1A.

The first curved part 26 includes a first curved surface 26A and a first additional curved surface 26B. The first curved surface 26A is disposed between the first inner side surface 22A and the first attachment surface 24A and is coupled to the first inner side surface 22A and the first attachment surface 24A. The first plate body 22 includes a first outer side surface 22B provided on a rear side of the first inner side surface 22A. The first additional curved surface 26B is disposed between the first outer side surface 22B and the first rear surface 24B and is coupled to the first outer side surface 22B and the first rear surface 24B. The first additional curved surface 26B defines a first recess 26C. The first recess 26C can suppress interference of a tool used to fasten and loosen the first bolt 40 with the first fastening plate 14.

As illustrated in FIG. 6, the second fastening part 34 includes a second rear surface 34B provided on a rear side of the second attachment surface 34A. The second openings 38 extend along the second center axis A2 from the second attachment surface 34A to the second rear surface 34B. In the present embodiment, the second attachment surface 34A and the second rear surface 34B are substantially perpendicular to the second center axis A2, but at least one of the second attachment surface 34A and the second rear surface 34B can be inclined with respect to the second center axis A2.

The second plate body 32 extends from the second curved part 36 away from the second attachment surface 34A. The second plate body 32 extends along the second direction D2 from the second curved part 36 away from the second attachment surface 34A. The second plate body 32 includes a second inner side surface 32A provided to face toward the first plate body 22. The second inner side surface 32A is at least partly inclined with respect to the second center axis A2. In the present embodiment, the second inner side surface 32A is entirely inclined with respect to the second center axis A2. However, the second inner side surface 32A can be partly inclined with respect to the second center axis A2 or can be at least partly parallel with the second center axis A2.

In the present embodiment, the first plate body 22 includes a first end surface 22E. The second plate body 32 includes a second end surface 32E. The first inner side surface 22A is inclined with respect to the first center axis A1 so that the fourth distance DS4 gradually increases from the first curved part 26 to the first end surface 22E. The second inner side surface 32A is inclined with respect to the second center axis A2 so that the fourth distance DS4 gradually increases from the second curved part 36 to the second end surface 32E.

As illustrated in FIG. 7, the work vehicle 1 includes a second bolt 50 and a second washer 52 to attach the drawbar bracket 12 to the work vehicle body 1A. In the present embodiment, the work vehicle 1 includes a plurality of second bolts 50 and a plurality of second washers 52. A total number of the second bolts 50 is not limited to that described in the present embodiment. A total number of the second washers 52 is not limited to that described in the present embodiment.

As illustrated in FIG. 6, the second fastening part 34 is fastened to the work vehicle body 1A (in the present embodiment, the transmission 8) with use of the second bolts 50. The second bolts 50 are inserted into the second openings 38 in a state where the drawbar bracket 12 is attached to the work vehicle body 1A. The second attachment surface 34A is in contact with the work vehicle body 1A (in the present embodiment, the transmission 8) in a state where the drawbar bracket 12 is attached to the work vehicle body 1A.

Each of the second bolts 50 includes a second male screw 50A and a second head 50B. The second male screw 50A is screwed into a second screw opening 54 of the transmission 8 through the second opening 38 in a state where the drawbar bracket 12 is attached to the work vehicle body 1A. The second fastening part 34 and the second washer 52 are sandwiched between the transmission 8 and the second head 50B in a state where the drawbar bracket 12 is attached to the work vehicle body 1A. The second washer 52 is in contact with the second rear surface 34B in a state where the drawbar bracket 12 is attached to the work vehicle body 1A.

The second curved part 36 includes a second curved surface 36A and a second additional curved surface 36B. The second curved surface 36A is disposed between the second inner side surface 32A and the second attachment surface 34A and is coupled to the second inner side surface 32A and the second attachment surface 34A. The second plate body 32 includes a second outer side surface 32B provided on a rear side of the second inner side surface 32A. The second additional curved surface 36B is disposed between the second outer side surface 32B and the second rear surface 34B and is coupled to the second outer side surface 32B and the second rear surface 34B. The second additional curved surface 36B defines a second recess 36C.

The second recess 36C can suppress interference of a tool used to fasten and loosen the second bolt 50 with the second fastening plate 16.

The first attachment surface 24A is spaced apart from the second attachment surface 34A in the first direction D1. In the present embodiment, the first attachment surface 24A is spaced apart from the second attachment surface 34A in the first direction D1. A position of the first attachment surface 24A in the second direction D2 is substantially identical to a position of the second attachment surface 34A in the second direction D2. In the present embodiment, the position of the first attachment surface 24A in the second direction D2 is identical to the position of the second attachment surface 34A in the second direction D2. However, the position of the first attachment surface 24A in the second direction D2 can be deviated from the position of the second attachment surface 34A in the second direction D2.

Figure 8:
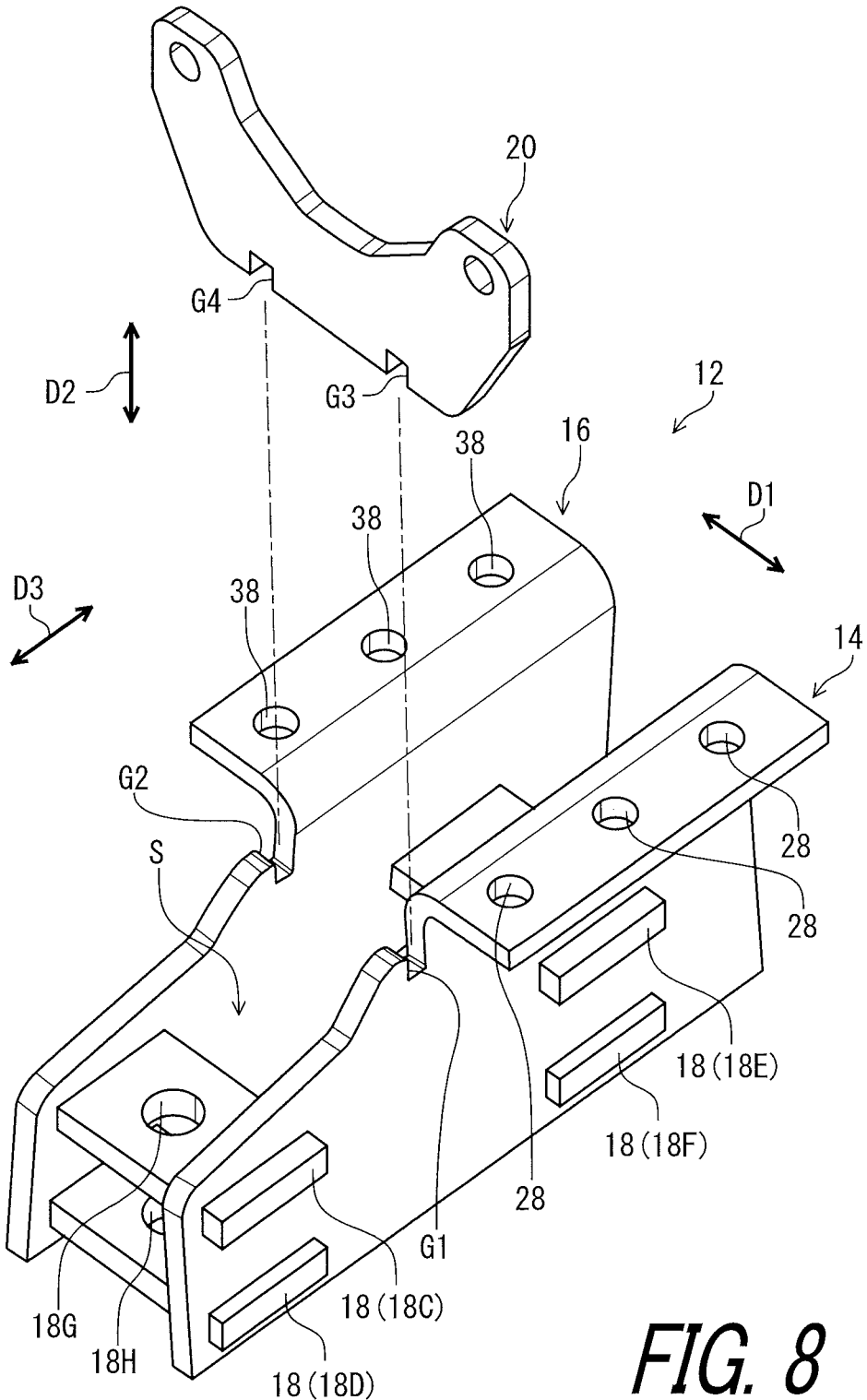
FIG. 8 is an exploded perspective view of the drawbar bracket illustrated in FIG. 3.

As illustrated in FIG. 8, the third fastening plate 20 couples the first plate body 22 to the second plate body 32. The first plate body 22 includes a first groove G1. The second plate body 32 includes a second groove G2. The third fastening plate 20 includes a third groove G3 and a fourth groove G4. The third fastening plate 20 is coupled to the first fastening plate 14 through engagement between the first groove G1 and the third groove G3. The third fastening plate 20 is coupled to the second fastening plate 16 through engagement between the second groove G2 and the fourth groove G4.

Figure 9:
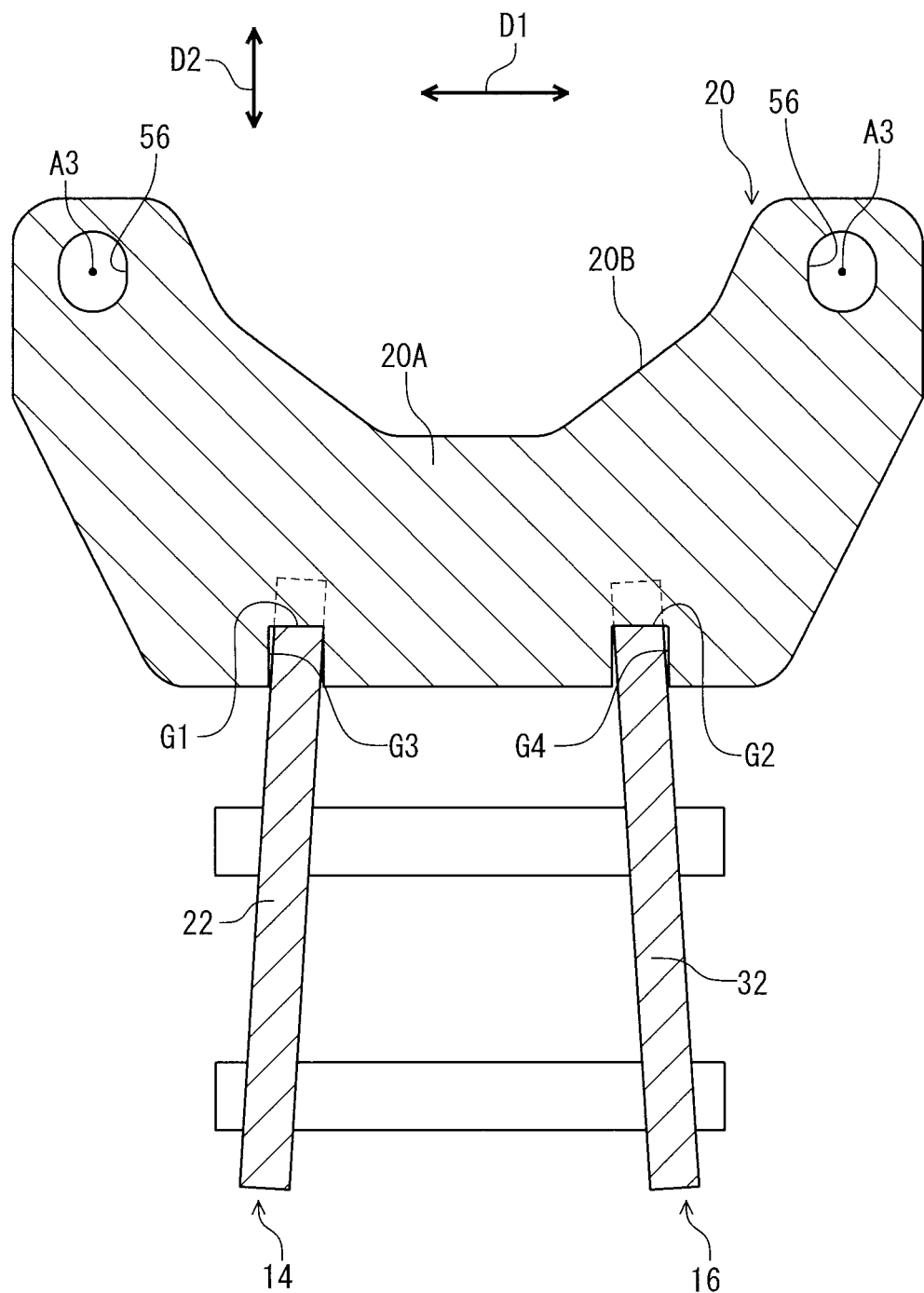
FIG. 9 is a cross-sectional view of the drawbar bracket taken along line IX-IX in FIG. 5.

As illustrated in FIG. 9, the third fastening plate 20 is partly disposed in the first groove G1 and the second groove G2. The first plate body 22 is partly disposed in the third groove G3. The second plate body 32 is partly disposed in the fourth groove G4. However, at least one of the first groove G1 and the third groove G3 can be omitted. At least one of the second groove G2 and the fourth groove G4 can be omitted.

Figure 10:
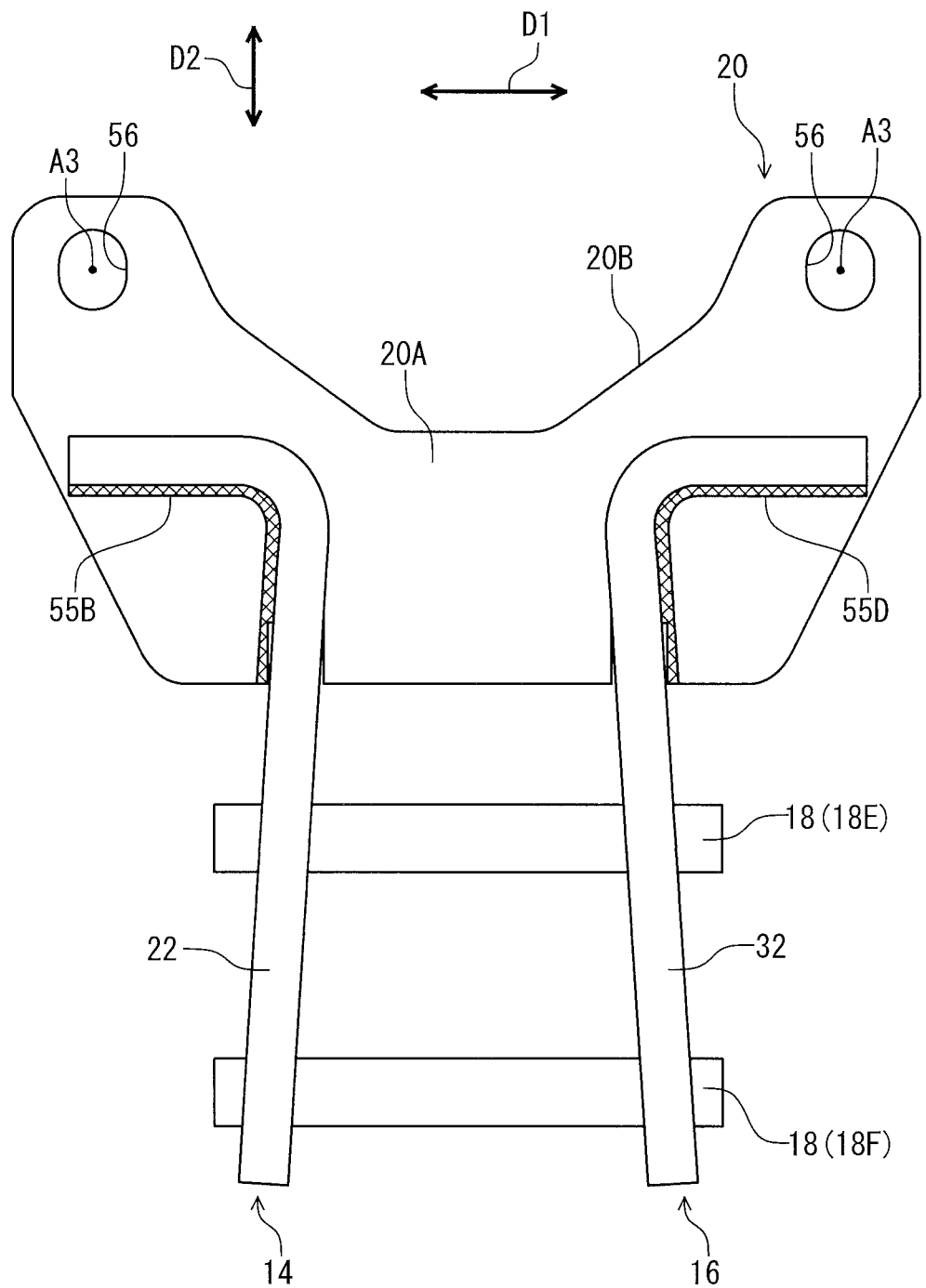
FIG. 10 is a front view of the drawbar bracket illustrated in FIG. 3.

As illustrated in FIG. 10, the third fastening plate 20 includes a third opening 56. In the present embodiment, the third fastening plate 20 includes a plurality of third openings 56. A total number of the third openings 56 is not limited to that described in the present embodiment. The third fastening plate 20 includes a third attachment surface 20A. The third opening 56 is provided on the third attachment surface 20A. Each of the third openings 56 includes a third center axis A3. In the present embodiment, the plurality of third openings 56A and 56B are provided on the third attachment surface 20A. Each of the plurality of third openings 56A and 56B includes the third center axis A3. The third openings 56 include an elongated hole. The third center axis A3 extends through a center of figure of each of the third openings 56 when viewed in a direction along the third center axis A3. The third openings 56 can include another structure instead of or in addition to the elongated hole. The third fastening plate 20 includes a recess 20B. The recess 20B is disposed between the third openings 56A and 56B.

Figure 11:
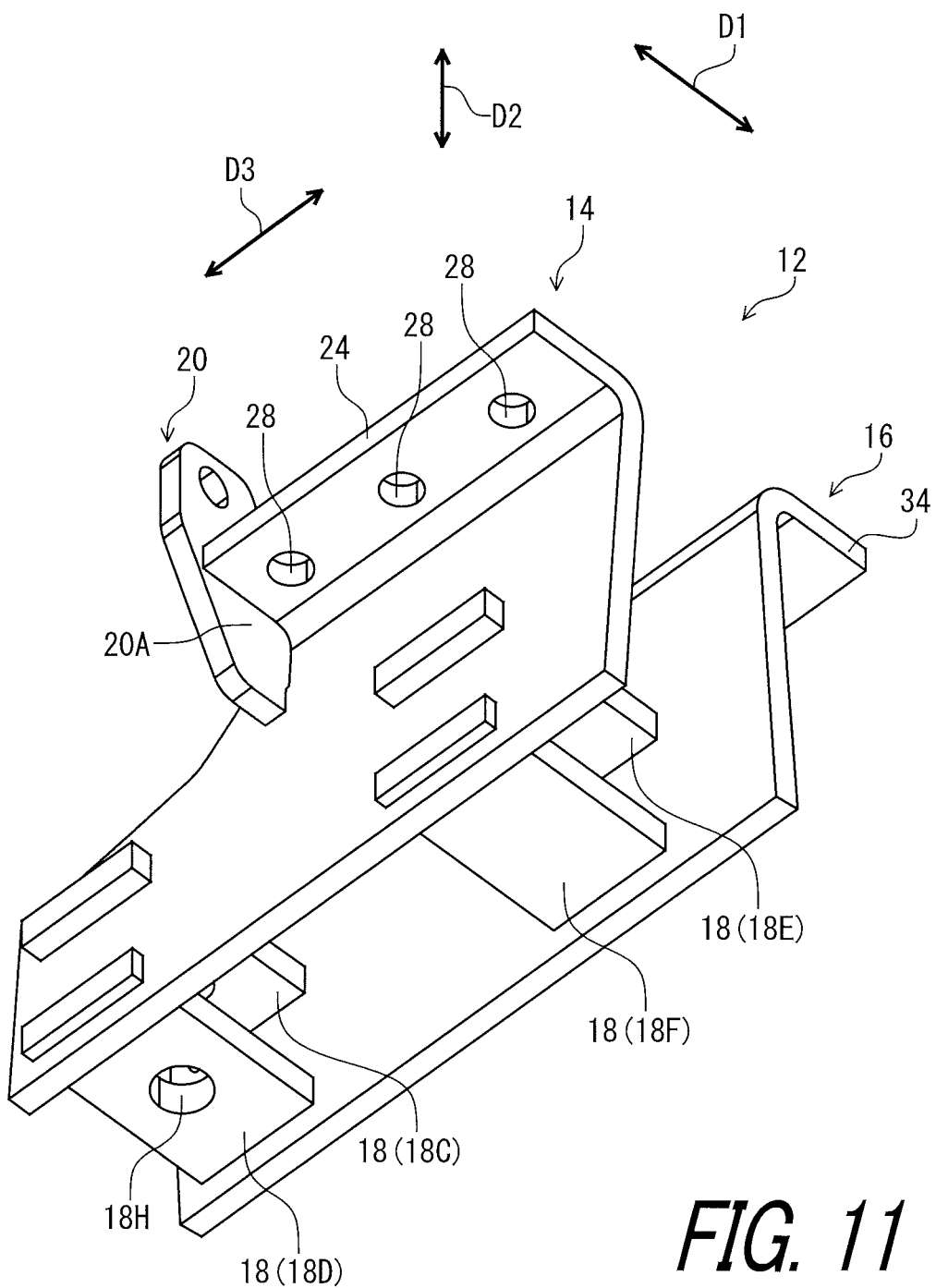
FIG. 11 is another perspective view of the drawbar bracket illustrated in FIG. 3.
Figure 12:
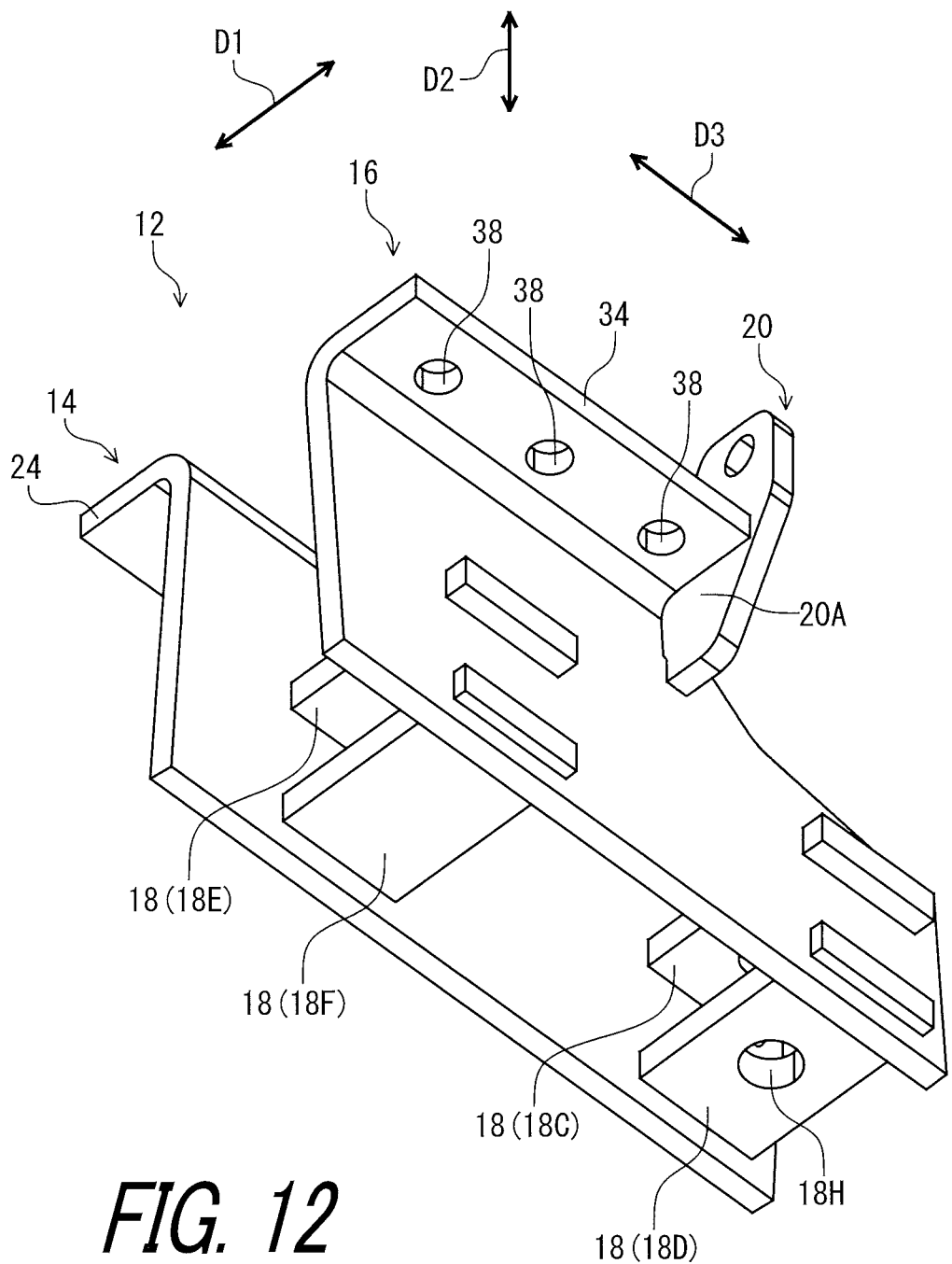
FIG. 12 is another perspective view of the drawbar bracket illustrated in FIG. 3.
Figure 13:
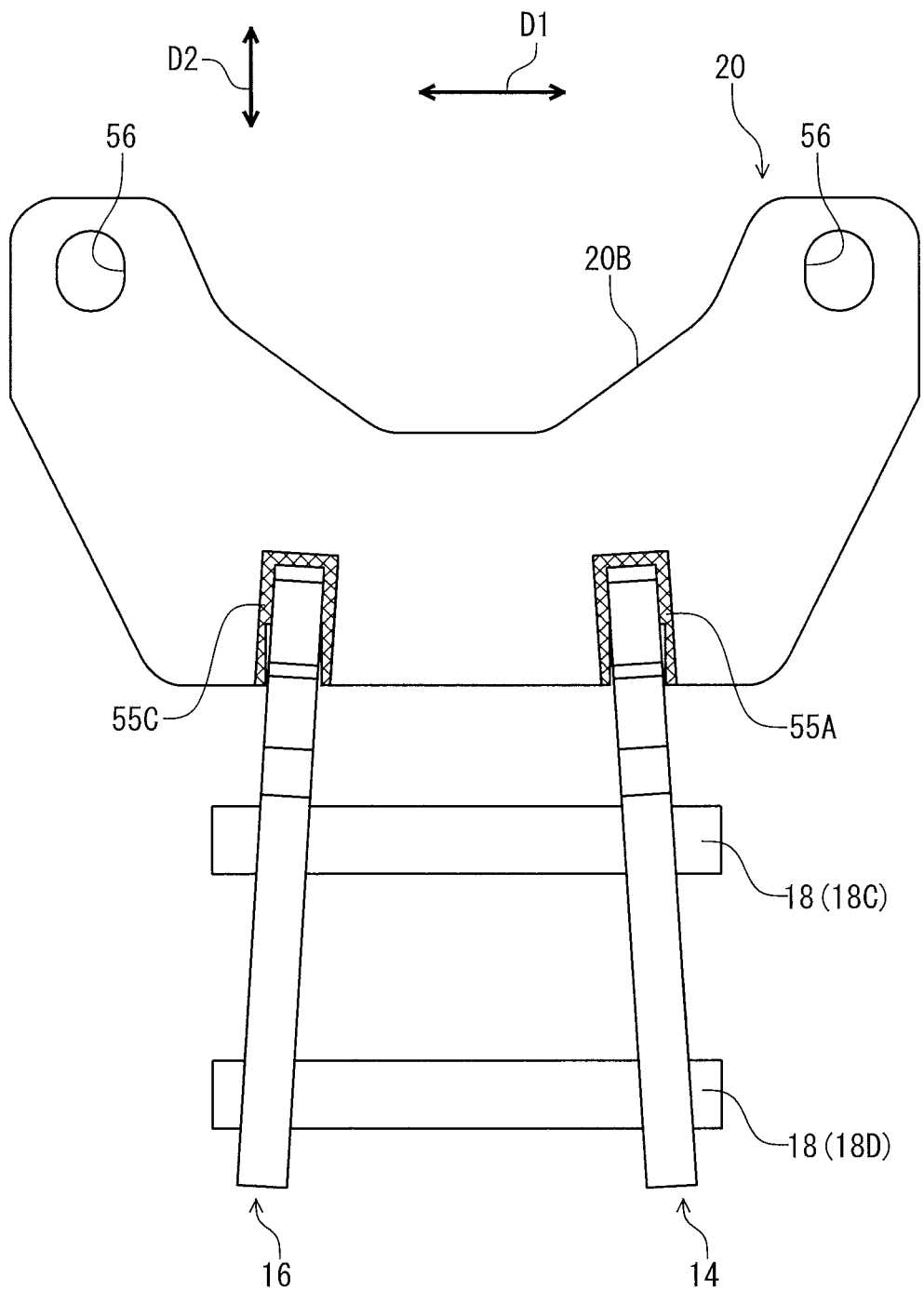
FIG. 13 is back view of the drawbar bracket illustrated in FIG. 3.

As illustrated in FIGS. 5, 11, and 12, the third attachment surface 20A of the third fastening plate 20 is in contact with the first fastening part 24 and the second fastening part 34. The third fastening plate 20 is fastened to the first fastening plate 14 and the second fastening plate 16, for example, by welding. In the present embodiment, the drawbar bracket 12 includes first welding parts 55A and 55B and second welding parts 55C and 55D as illustrated in FIGS. 10 and 13. The first welding parts 55A and 55B and the second welding parts 55C and 55D are parts formed by welding. The first welding parts 55A and 55B fasten the third fastening plate 20 to the first fastening plate 14. The second welding parts 55C and 55D fasten the third fastening plate 20 to the second fastening plate 16. A range of welding is not limited to the first and second welding parts 55A to 55D. The third fastening plate 20 can be fastened to the first fastening plate 14 and the second fastening plate 16 by another method.

As illustrated in FIG. 5, the work vehicle 1 includes a third bolt 58, a third washer 60, and a fourth washer 62 which are provided to attach the drawbar bracket 12 to the work vehicle body 1A. In the present embodiment, the work vehicle 1 includes a plurality of third bolts 58 and a plurality of third washers 60. A total number of the third bolts 58 is not limited to that described in the present embodiment. A total number of the third washers 60 is not limited to that described in the present embodiment. A total number of the fourth washers 62 is not limited to that described in the present embodiment. In the present embodiment, the third washers 60 are flat washers, and the fourth washers 62 are spring washers. However, the kinds of the third washers 60 and the fourth washers 62 are not limited to those described in the present embodiment. The third washers 60 and/or the fourth washers 62 can be omitted.

The third bolts 58 are inserted into the third openings 56 in a state where the drawbar bracket 12 is attached to the work vehicle body 1A. The third attachment surface 20A is in contact with the work vehicle body 1A (in the present embodiment, the transmission 8) in a state where the drawbar bracket 12 is attached to the work vehicle body 1A.

Each of the third bolts 58 includes a third male screw 58A and a third head 58B. The third male screw 58A is screwed into a third screw opening 64 of the transmission 8 through the third opening 56 in a state where the drawbar bracket 12 is attached to the work vehicle body 1A. The third fastening plate 20, the third washers 60, and the fourth washers 62 are sandwiched between the transmission 8 and the third heads 58B in a state where the drawbar bracket 12 is attached to the work vehicle body 1A. The third fastening plate 20 includes a third rear surface 20C provided on a rear side of the third attachment surface 20A. The third washers 60 are in contact with the third rear surface 20C in a state where the drawbar bracket 12 is attached to the work vehicle body 1A.

Figure 14:
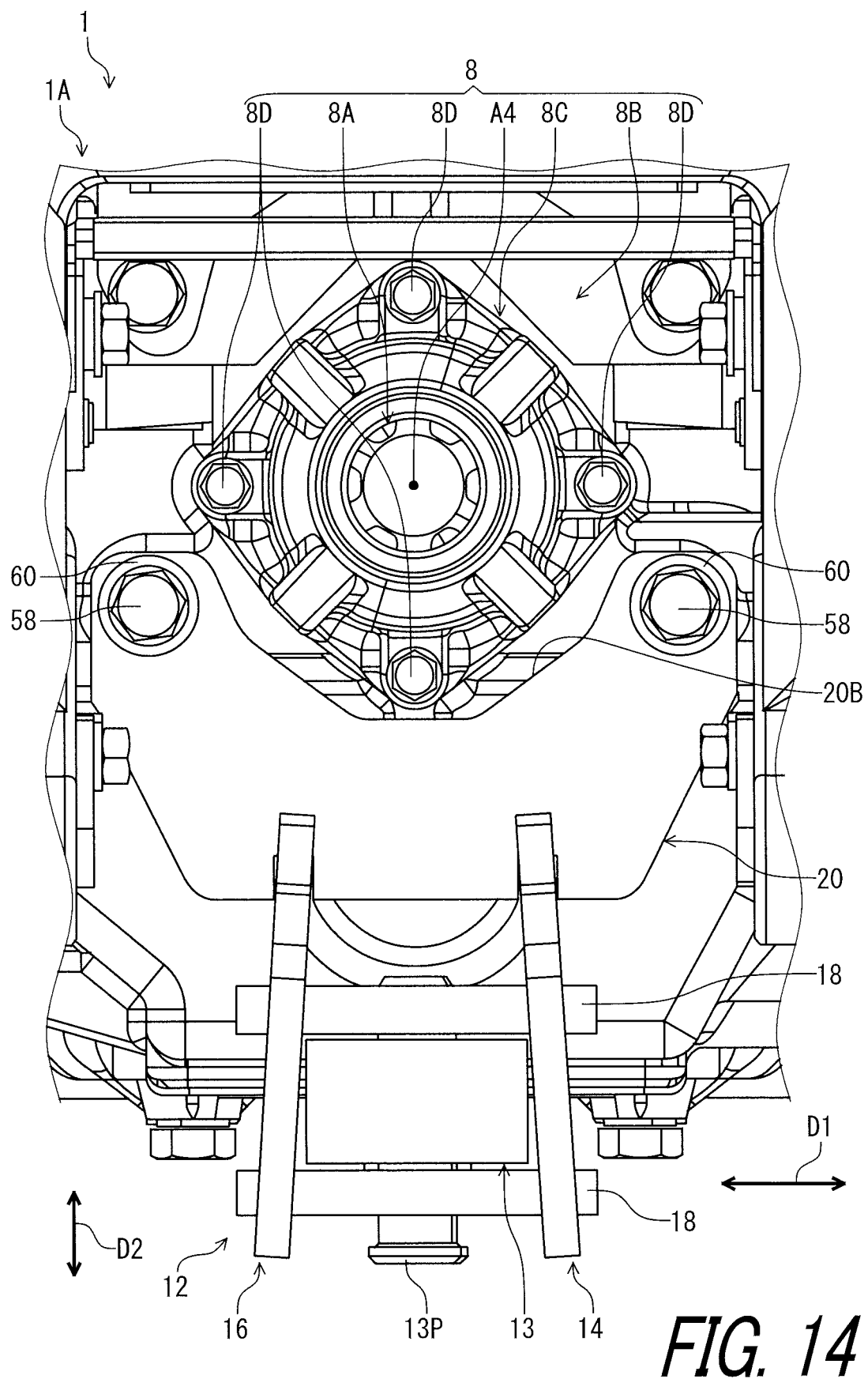
FIG. 14 is a partial back view of the work vehicle illustrated in FIG. 1.

As illustrated in FIG. 14, the transmission 8 includes a transmission case 8B, a bearing 8C, and a plurality of fastening bolts 8D. The bearing 8C is fastened to the transmission case 8B with use of the plurality of fastening bolts 8D. The bearing 8C rotatably supports the PTO shaft 8A about a rotational axis A4 with respect to the transmission case 8B. The bearing 8C is at least partly disposed in the recess 20B of the third fastening plate 20 when viewed in a direction extending along the rotational axis A4 in a state where the drawbar bracket 12 is attached to the transmission 8. In the present embodiment, the bearing 8C is partly disposed in the recess 20B of the third fastening plate 20 when viewed in a direction extending along the rotational axis A4 in a state where the drawbar bracket 12 is attached to the transmission 8. However, the bearing 8C can be entirely disposed in the recess 20B of the third fastening plate 20 when viewed in a direction extending along the rotational axis A4 in a state where the drawbar bracket 12 is attached to the transmission 8. The recess 20B can be omitted from the third fastening plate 20.

Figure 15:
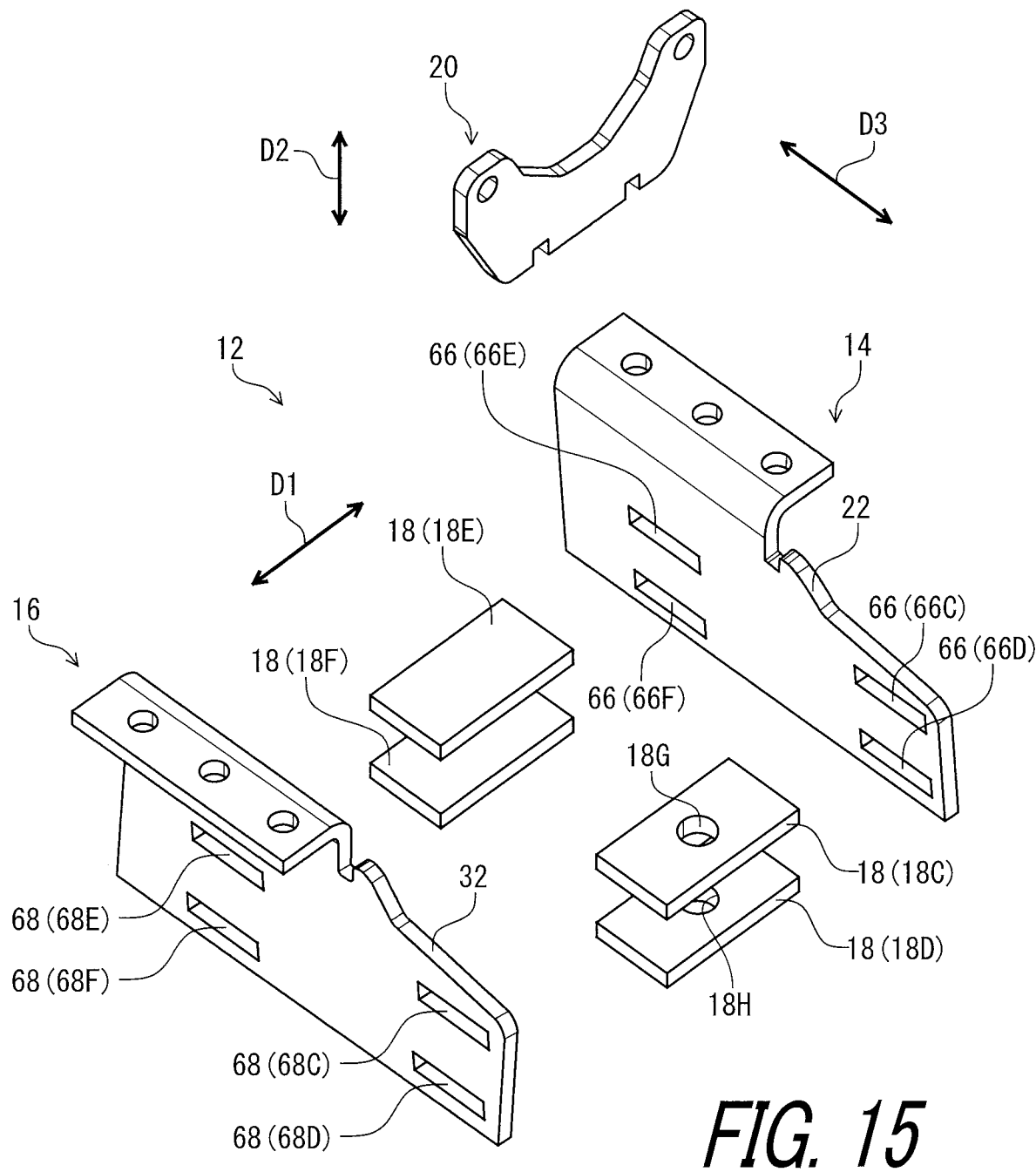
FIG. 15 is an exploded perspective view of the drawbar bracket illustrated in FIG.

As illustrated in FIG. 15, the coupling members 18 extend in the first direction D1 between the first fastening plate 14 and the second fastening plate 16. The first plate body 22 includes a first coupling opening 66. The second plate body 32 includes a second coupling opening 68. In the present embodiment, the first plate body 22 includes a plurality of first coupling openings 66 (66C to 66F). The second plate body 32 includes a plurality of second coupling openings 68 (68C to 68F). The coupling member 18C is inserted into the first coupling opening 66C and the second coupling opening 68C. The coupling member 18D is inserted into the first coupling opening 66D and the second coupling opening 68D. The coupling member 18E is inserted into the first coupling opening 66E and the second coupling opening 68E. The coupling member 18F is inserted into the first coupling opening 66F and the second coupling opening 68F.

The coupling member 18C is spaced apart from the coupling member 18D in the second direction D2. The coupling member 18E is spaced apart from the coupling member 18F in the second direction D2. The coupling member 18C is spaced apart from the coupling member 18E in the third direction D3. The coupling member 18D is spaced apart from the coupling member 18F in the third direction D3.

Figure 16:
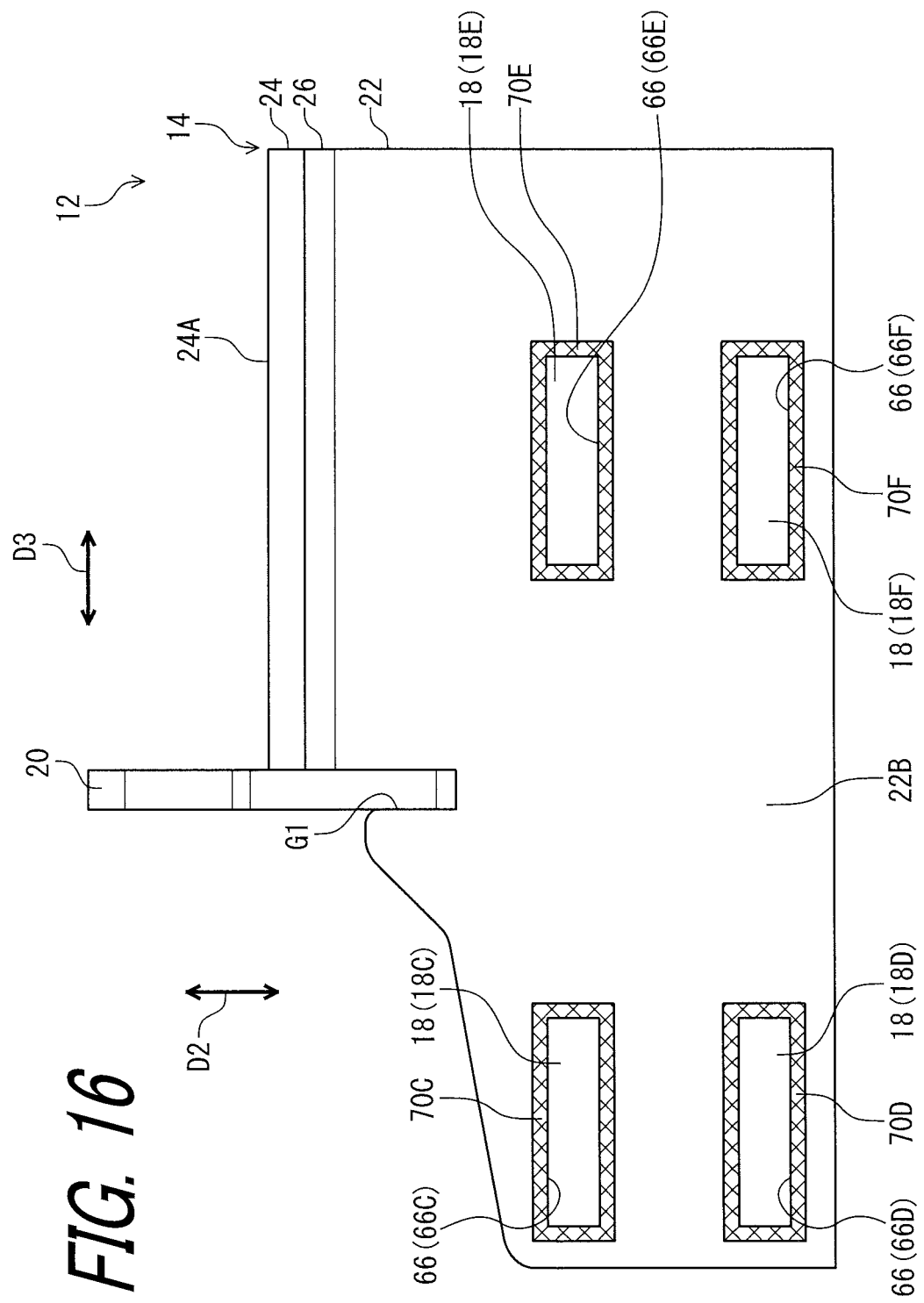
FIG. 16 is a side view of the drawbar bracket illustrated in FIG. 3.
Figure 17:
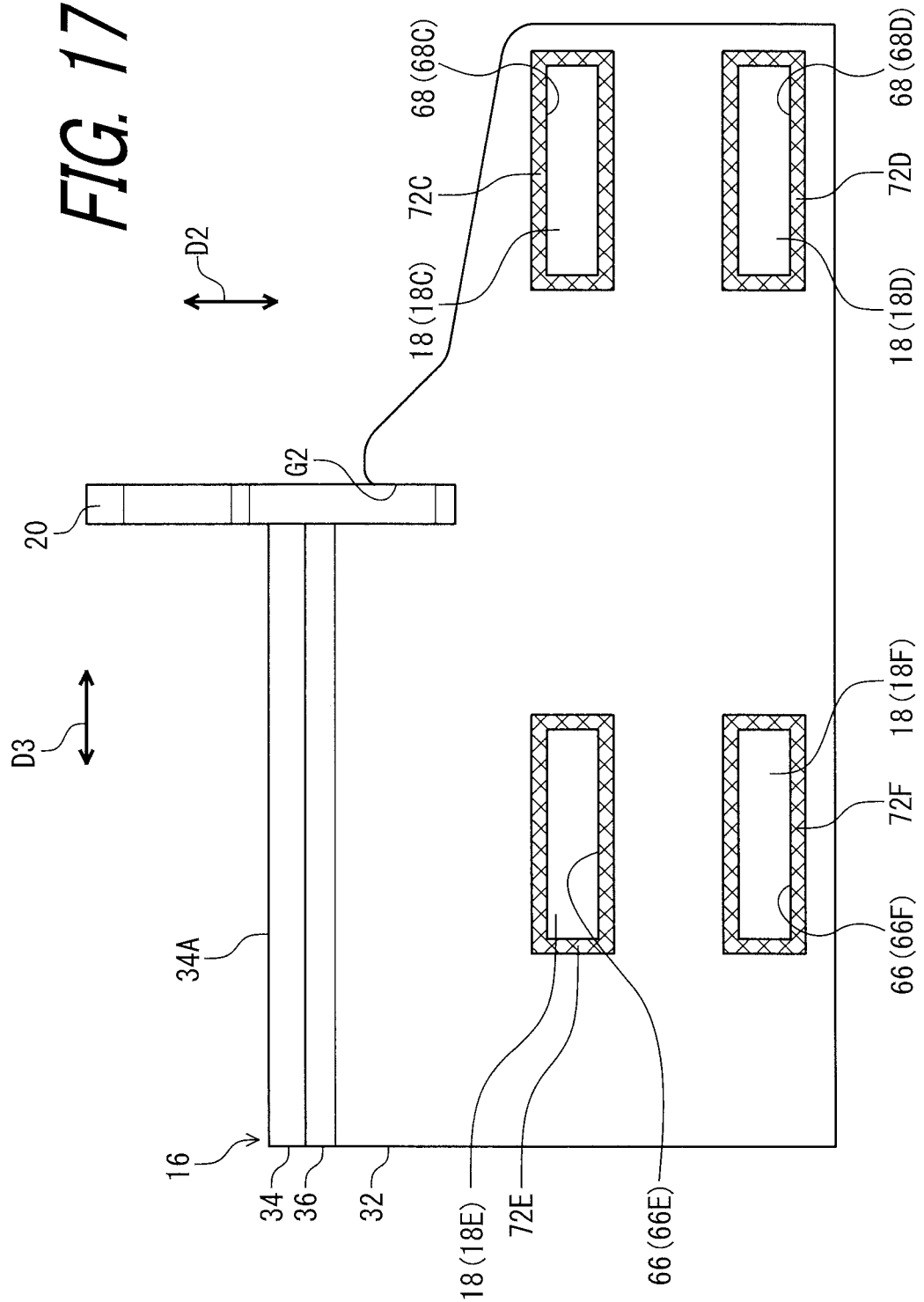
FIG. 17 is another side view of the drawbar bracket illustrated in FIG. 3.

As illustrated in FIGS. 16 and 17, the coupling members 18C to 18F are fastened to the first plate body 22 and the second plate body 32, for example, by welding. In the present embodiment, the drawbar bracket 12 includes third welding parts 70C to 70F and fourth welding parts 72C to 72F. The third welding parts 70C to 70F fasten the coupling members 18C and 18F to the first fastening plate 14. The fourth welding parts 72C to 72F fasten the coupling members 18C and 18F to the second fastening plate 16. However, a range of welding is not limited to the third welding parts 70C to 70F and the fourth welding parts 72C to 72F. The coupling members 18C to 18F can be fastened to the first fastening plate 14 and the second fastening plate 16 by another method.

Figure 18:
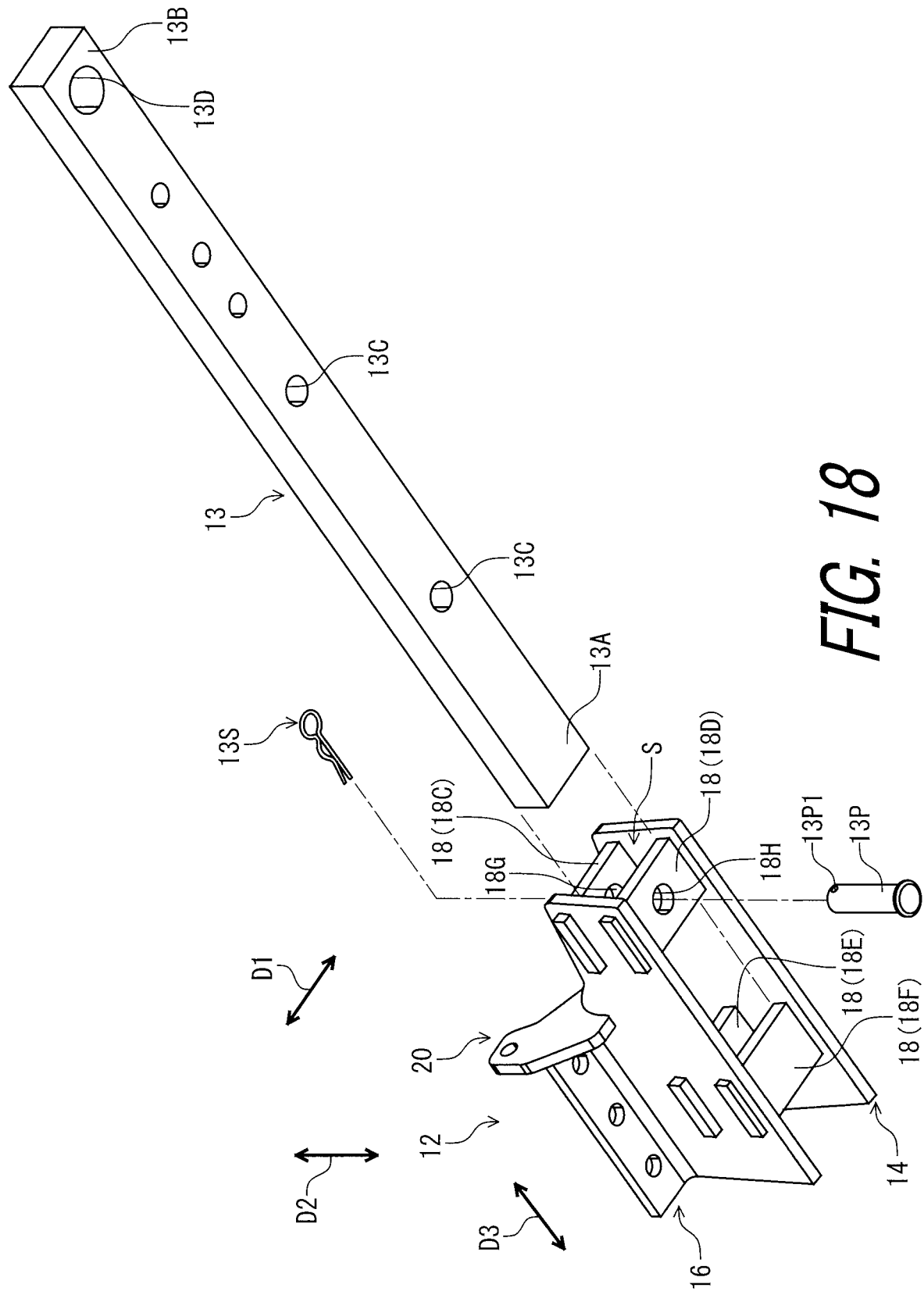
FIG. 18 is an exploded perspective view of the drawbar bracket and a drawbar illustrated in FIG. 2.

As illustrated in FIG. 18, the drawbar 13 includes a first end 13A, a second end 13B, a plurality of first coupling holes 13C, and a second coupling hole 13D. The drawbar 13 extends from the first end 13A to the second end 13B. The drawbar 13 is inserted into the insertion space S of the drawbar bracket 12. The drawbar 13 is disposed between the coupling members 18C and 18D in a state where the drawbar 13 is disposed in the insertion space S (in a state where the drawbar 13 is disposed between the first fastening plate 14 and the second fastening plate 16). The drawbar 13 is disposed between the coupling members 18E and 18F in a state where the drawbar 13 is disposed in the insertion space S (in a state where the drawbar 13 is disposed between the first fastening plate 14 and the second fastening plate 16). For example, the first end 13A of the drawbar 13 is disposed between the coupling members 18E and 18F in a state where the drawbar 13 is disposed in the insertion space S (in a state where the drawbar 13 is disposed between the first fastening plate 14 and the second fastening plate 16). The position of the drawbar 13 in the first direction D1 and the second direction D2 relative to the drawbar bracket 12 is determined by the first fastening plate 14, the second fastening plate 16, and the coupling members 18C to 18F.

The coupling member 18C includes a coupling hole 18G. The coupling member 18D includes a coupling hole 18H. The coupling pin 13P is inserted into the coupling holes 18G and 18H and is inserted into one of the plurality of first coupling holes 13C in a state where the drawbar 13 is disposed in the insertion space S. A snap pin 13S is inserted into a hole 13P1 of the coupling pin 13P in a state where the coupling pin 13P is disposed in the first coupling hole 13C. This determines the position of the drawbar 13 in the third direction D3 relative to the drawbar bracket 12. In this way, the drawbar 13 can be detachably coupled to the work vehicle body 1A by the drawbar bracket 12. When an external device such as a work machine or a trailer is coupled to the second coupling hole 13D, the external device can be towed by the work vehicle 1.

Figure 19:
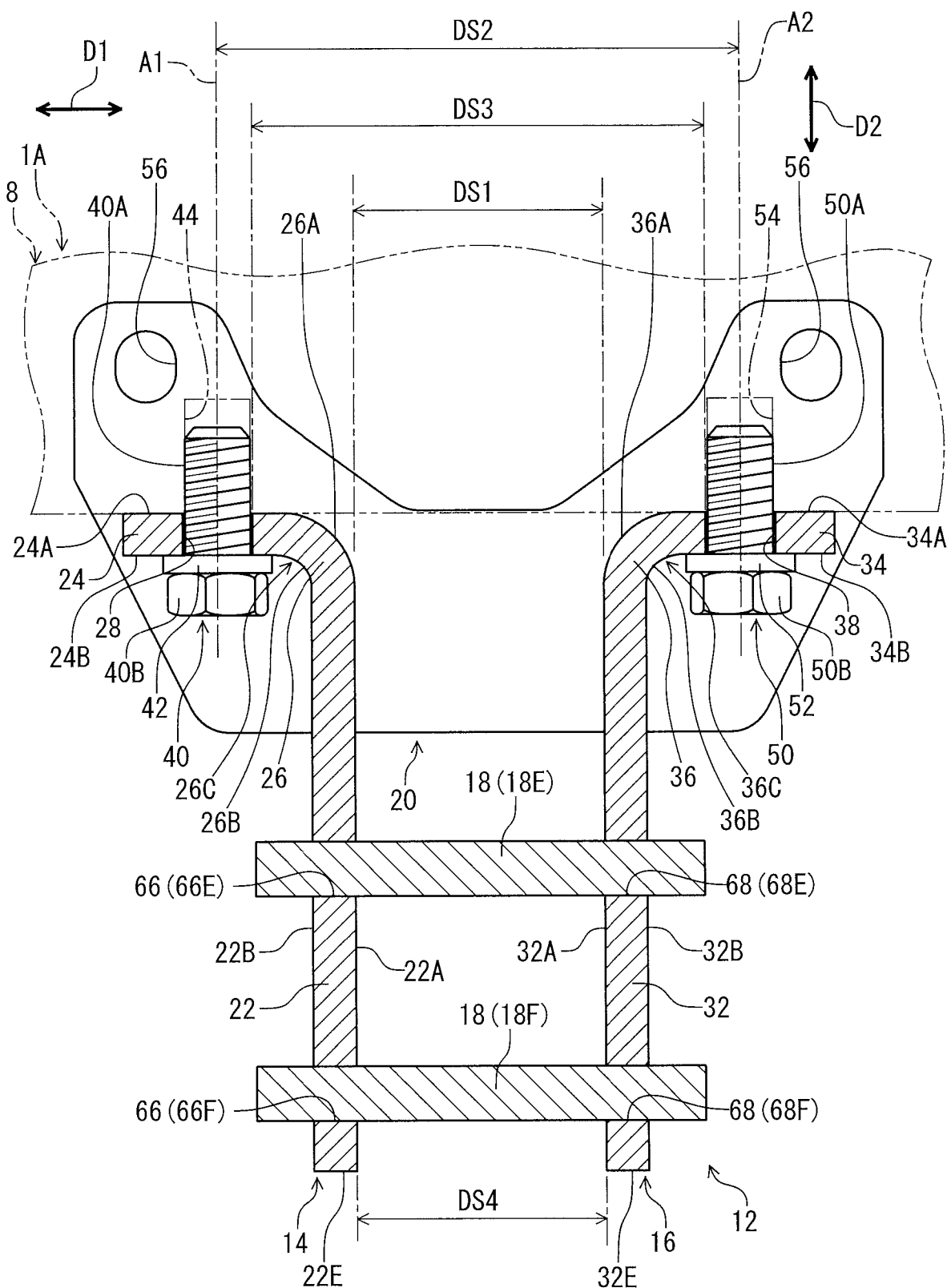
FIG. 19 is a cross-sectional view of a drawbar bracket in accordance with a modification.

In the above embodiment, the first inner side surface 22A and the second inner side surface 32A are inclined with respect to the first center axis A1 and the second center axis A2, respectively, as illustrated in FIG. 6. However, the first inner side surface 22A can be parallel with the first center axis A1 as illustrated in FIG. 19. The second inner side surface 32A can be parallel with the second center axis A2. In this modification, for example, the fourth distance DS4 is constant and is equal to the first distance DS1.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

Terms of degree such as "substantially," "about" and "approximately" as used herein mean a reasonable amount of deviation of the modified team such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A drawbar bracket comprising:
   a first fastening plate;
   a second fastening plate spaced apart from the first fastening plate in a first direction;
   a third fastening plate; and
   a coupling member coupling the first fastening plate to the second fastening plate,
   the first fastening plate comprising:
      a first plate body coupled to the coupling member;
      a first fastening part having a first attachment surface facing in a second direction different from the first direction; and
      a first curved part coupling the first plate body to the first fastening part and having a curved shape,
   the second fastening plate comprising:
      a second plate body spaced apart from the first plate body in the first direction and coupled to the coupling member;
      a second fastening part having a second attachment surface facing in the second direction; and
      a second curved part coupling the second plate body to the second fastening part and having a curved shape,
   the third fastening plate coupling the first plate body to the second plate body,
   the first plate body including a first groove,
   the second plate body including a second groove, and
   the third fastening plate being partly disposed in the first groove and the second groove.

2. The drawbar bracket according to claim 1, wherein the first fastening part extends from the first curved part toward an opposite side of the second fastening part.

3. The drawbar bracket according to claim 1, wherein the second fastening part extends from the second curved part toward an opposite side of the first fastening part.

4. The drawbar bracket according to claim 1, wherein the first curved part is spaced apart from the second curved part in the first direction.

5. The drawbar bracket according to claim 1, wherein the first fastening part includes a first opening provided on the first attachment surface.

6. The drawbar bracket according to claim 5, wherein the first opening includes a first center axis,
the first plate body includes a first inner side surface provided to face toward the second plate body, and
the first inner side surface is at least partly inclined with respect to the first center axis.

7. The drawbar bracket according to claim 1, wherein the second fastening part includes a second opening provided on the second attachment surface.

8. The drawbar bracket according to claim 7, wherein the second opening includes a second center axis,
the second plate body includes a second inner side surface provided to face toward the first plate body, and
the second inner side surface is at least partly inclined with respect to the second center axis.

9. The drawbar bracket according to claim 1, wherein the first fastening part includes a first opening provided on the first attachment surface,
the second fastening part includes a second opening provided on the second attachment surface,
the first opening includes a first center axis,
the second opening includes a second center axis,
a first distance is defined between the first curved part and the second curved part in the first direction,
a second distance is defined between the first center axis and the second center axis in the first direction, and
the second distance is longer than the first distance.

10. The drawbar bracket according to claim 1, wherein the first plate body extends from the first curved part away from the first attachment surface.

11. The drawbar bracket according to claim 1, wherein the second plate body extends from the second curved part away from the second attachment surface.

12. The drawbar bracket according to claim 1, wherein the first attachment surface is spaced apart from the second attachment surface in the first direction.

13. The drawbar bracket according to claim 12, wherein a position of the first attachment surface in the second direction is substantially identical to a position of the second attachment surface in the second direction.

14. The drawbar bracket according to claim 1, wherein the third fastening plate includes a third groove and a fourth groove,
the third fastening plate is coupled to the first fastening plate through engagement between the first groove and the third groove, and
the third fastening plate is coupled to the second fastening plate through engagement between the second groove and the fourth groove.

15. The drawbar bracket according to claim 1, wherein the third fastening plate includes a third groove and a fourth groove, the first plate body is partly disposed in the third groove, and the second plate body is partly disposed in the fourth groove.

16. The drawbar bracket according to claim 1, wherein
the first plate body, the first fastening part, and the first curved part are integrally provided as a one-piece unitary member, and
the second plate body, the second fastening part, and the second curved part are integrally provided as a one-piece unitary member.

17. A work vehicle comprising:
a work vehicle body; and
the drawbar bracket according to claim 1,
the first fastening part and the second fastening part of the drawbar bracket being secured to the work vehicle body.

18. The work vehicle according to claim 17, wherein
the first fastening part and the second fastening part of the drawbar bracket are fastened to the transmission.

\* \* \* \* \*